(12) United States Patent
Rubino et al.

(10) Patent No.: US 11,114,714 B2
(45) Date of Patent: Sep. 7, 2021

(54) MINIATURE ELECTROCHEMICAL CELL HAVING A CASING OF A METAL CONTAINER CLOSED WITH A CERAMIC PLATE HAVING TWO VIA HOLES SUPPORTING OPPOSITE POLARITY PLATINUM-CONTAINING CONDUCTIVE PATHWAYS

(71) Applicant: Greatbatch Ltd., Clarence, NY (US)

(72) Inventors: Robert S. Rubino, Williamsville, NY (US); Keith W. Seitz, Clarence Center, NY (US); Brian P. Hohl, Clarence, NY (US)

(73) Assignee: Greatbatch Ltd., Clarence, NY (US)

( * ) Notice: Subject to any disclaimer, the term of this patent is extended or adjusted under 35 U.S.C. 154(b) by 178 days.

(21) Appl. No.: 16/431,025

(22) Filed: Jun. 4, 2019

(65) Prior Publication Data

US 2020/0388796 A1 Dec. 10, 2020

(51) Int. Cl.
*H01M 50/116* (2021.01)
*H01M 4/525* (2010.01)
*H01M 50/10* (2021.01)

(52) U.S. Cl.
CPC ......... *H01M 50/116* (2021.01); *H01M 4/525* (2013.01); *H01M 50/10* (2021.01); *H01M 2300/0071* (2013.01)

(58) Field of Classification Search
CPC ..... H01M 50/116; H01M 50/10; H01M 4/525
See application file for complete search history.

(56) References Cited

U.S. PATENT DOCUMENTS

| 5,338,625 | A | 8/1994 | Bates et al. |
| 6,268,079 | B1 | 7/2001 | Inoue et al. |
| 6,782,290 | B2 | 8/2004 | Schmidt |
| 6,818,356 | B1 | 11/2004 | Bates |

(Continued)

FOREIGN PATENT DOCUMENTS

| DE | 102011103975 A1 | 12/2012 |
| EP | 0269007 A1 | 6/1988 |

(Continued)

OTHER PUBLICATIONS

"Extended European Search Report", Application No. 19150718.5, dated Apr. 4, 2019.

*Primary Examiner* — Jimmy Vo
(74) *Attorney, Agent, or Firm* — Michael F. Scalise

(57) ABSTRACT

A miniature electrochemical cell having a volume of less than 0.5 cc includes a casing having a header assembly comprising a ceramic plate formed by co-firing a metallic-containing paste in first and second via holes extending through a green-state ceramic. The ceramic plate is joined to a metal ring by a gold-braze to form the header assembly that is secured to an open-ended metal container by a weld to provide the casing. The fill material resulting from sintering the metallic-containing paste provides a first conductive pathway to the anode current collector contacting an anode active material and a second conductive pathway to a cathode current collector contacting a cathode active material. A solid electrolyte activates the anode and cathode while also serving as a separator. Outer surfaces of the first and second conductive pathways are configured for electrical connection to a load.

20 Claims, 1 Drawing Sheet

(56) References Cited

U.S. PATENT DOCUMENTS

| | | |
|---|---|---|
| 6,984,468 B2 | 1/2006 | Rubino et al. |
| 7,022,146 B2 | 4/2006 | Rubino et al. |
| 7,524,577 B2 | 4/2009 | Bates |
| 7,553,582 B2 | 6/2009 | Bates |
| 7,811,702 B2 | 10/2010 | Laurent et al. |
| 8,653,384 B2 | 2/2014 | Tang et al. |
| 8,679,674 B2 | 3/2014 | Liang et al. |
| 8,697,278 B2 | 4/2014 | Schnell et al. |
| 8,778,532 B2 | 7/2014 | Salot et al. |
| 8,815,450 B1 | 8/2014 | Bates |
| 8,865,340 B2 | 10/2014 | Liang et al. |
| 9,318,774 B2 | 4/2016 | Bhardwaj et al. |
| 9,455,423 B2 | 9/2016 | Etzkorn et al. |
| 9,599,842 B2 | 3/2017 | Flitsch et al. |
| 9,793,522 B2 | 10/2017 | Bhardwaj et al. |
| 9,887,403 B2 | 2/2018 | Huang et al. |
| 10,236,480 B2 | 3/2019 | Fallourd |
| 2001/0032666 A1* | 10/2001 | Jenson .................. H01G 11/56 136/256 |
| 2005/0007718 A1 | 1/2005 | Stevenson et al. |
| 2010/0129717 A1 | 5/2010 | Bedjaoui et al. |
| 2015/0004478 A1 | 1/2015 | Prinzbach et al. |
| 2015/0214567 A1 | 7/2015 | Etzkorn et al. |
| 2016/0049624 A1 | 2/2016 | Bhardwaj et al. |
| 2016/0254566 A1 | 9/2016 | Pepin et al. |
| 2016/0325105 A1 | 11/2016 | Etzkorn et al. |
| 2016/0365584 A1 | 12/2016 | Etzkorn et al. |
| 2018/0050210 A1* | 2/2018 | Nikolaidis .......... C22C 32/0021 |
| 2018/0108496 A1 | 4/2018 | Venkateswaran et al. |
| 2018/0126176 A1* | 5/2018 | Seitz .................... H01B 17/303 |

FOREIGN PATENT DOCUMENTS

| | | |
|---|---|---|
| EP | 2262036 B1 | 3/2012 |
| EP | 2192638 B1 | 4/2013 |
| EP | 2469620 B1 | 8/2013 |

* cited by examiner

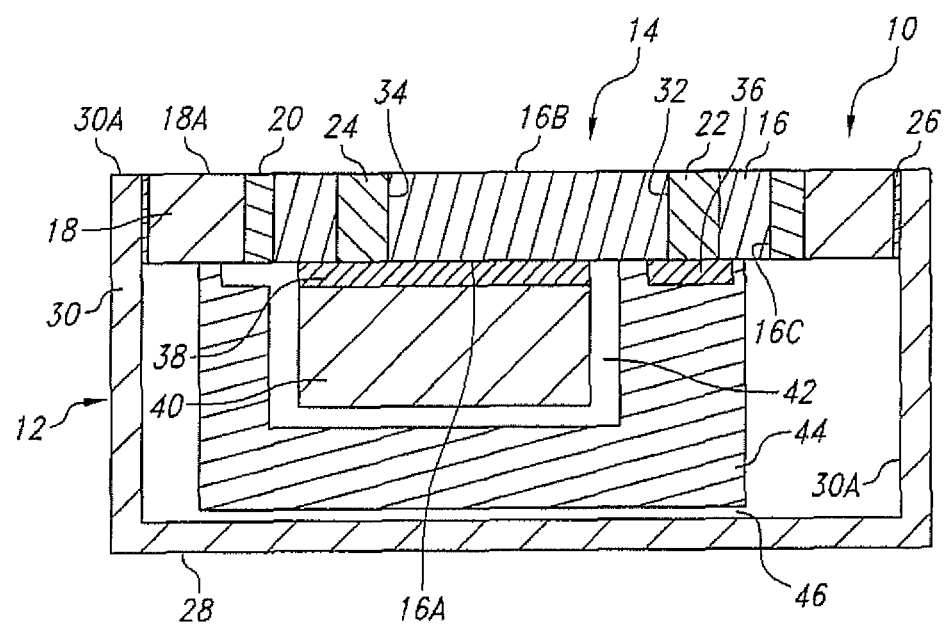

MINIATURE ELECTROCHEMICAL CELL HAVING A CASING OF A METAL CONTAINER CLOSED WITH A CERAMIC PLATE HAVING TWO VIA HOLES SUPPORTING OPPOSITE POLARITY PLATINUM-CONTAINING CONDUCTIVE PATHWAYS

BACKGROUND OF THE INVENTION

1. Field of the Invention

This invention relates to the conversion of chemical energy to electrical energy. More particularly, the present invention relates to an electrochemical cell having a total size or volume that is less than 0.5 cc. Such so-called miniaturized electrochemical cells enable numerous new and improved medical device therapies. Miniature electrochemical cells are defined as those having a size or total volume that is less than 0.5 cc.

2. Prior Art

Electrochemical cells must have two opposite polarity terminals that are electrically isolated from each other. In use, the terminals are connected to a load, such as the circuitry in an implantable medical device to power the medical device. In that respect, an electrochemical cell which is sufficiently hermetic to prevent ingress of moisture and egress of electrolyte so that it can operate for ten years or more requires robust sealing methodologies while still providing adequate electrical isolation between the opposite polarity terminals. However, conventional sealing techniques are often not practical when cell size drops below 0.5 cc. That is because the seals themselves take up a major portion of the overall cell volume.

Thin film batteries are a convenient approach for the assembly of small cells. Electroactive layers are deposited, typically by physical vapor deposition, onto a substrate with an intermediary layer of solid electrolyte that also functions as a separator to electrically isolate the two terminals. The substrate must be able to withstand high temperatures during layer deposition and during any required annealing of the deposited layers. Typically, ceramics are used as substrates with a non-porous lid attached using a polymeric adhesive layer that also serves as the feedthrough seal for the electrically charged terminals. The problem is that the polymeric adhesive layer cannot consistently and adequately prevent egress or ingress of atmospheric contaminants that can disrupt charging and discharging of the cell. For example, ingress of water is particularly problematic for lithium cells. Thus, polymeric seals may not provide the consistent longevity required for some applications.

Moreover, as electrochemical cells become smaller and smaller, it becomes more difficult to find space for a port for filling electrolyte into their casing. As the fill port becomes smaller, it becomes increasingly more difficult to find a practical means of plugging and hermetically sealing the fill port. For electrochemical cells that have a total volume or size that is less than 0.5 cc, it becomes advantageous to use a solid electrolyte so that no filling is required.

Further, since secondary electrochemical cells activated with a solid electrolyte typically undergo expansion and contraction during charging and discharging, they require hermetic casings that suitably accommodate this cycling induced dimensional change. Those types of hermetic casings for miniature electrochemical cells do not currently exist.

For that reason, the present invention provides a casing construction that is suitable for use with hermetically sealed solid-state secondary or re-chargeable electrochemical cells and that has sufficient dimensional flexibility to accommodate the expected dimensional changes during cycling. While useful with cells of virtually any size, the present hermetic casing is particularly well suited for cells having a total volume or size that is less than 0.5 cc.

SUMMARY OF THE INVENTION

The present invention describes an electrochemical cell construction which is readily adapted to miniature cell designs. However, while the present casing is adapted for miniature electrochemical systems, the casing design is also applicable to cells that are not classified as "miniature". A miniature electrochemical cell is defined as one having a total volume that is less than 0.5 cc.

With cell sizes below 0.5 cc, it may become advantageous to use a solid electrolyte so that filling the casing with a liquid is not required. However, conventional solid electrolyte cells are known to undergo expansion and contraction during cycling and consequently require hermetic casing structures that are designed to accommodate the expected dimensional changes. Hermetic enclosure designs for miniature cells activated with solid electrolyte systems do not currently exist. Therefore, one aspect of the present invention is to provide a hermetic casing structure for a miniature solid-state electrochemical cell that will accommodate the required dimensional changes during cycling.

Another problem with conventional miniature electrochemical cell designs is the need for the materials from which the cell is constructed to be both chemically compatible with each other and not susceptible to undesirable corrosion reactions. A miniature electrochemical cell according to the present invention uses a conductive metal-containing paste that is filled into both an anode via hole and a cathode via hole extending through a ceramic plate-shaped substrate. The ceramic plate is then sintered to provide a hermetic feedthrough or header assembly.

Next, anode and cathode current collectors are deposited on an inner surface of the lapped and polished ceramic plate in contact with the respective via fill materials of the feedthrough or header assembly. In addition to providing electrical conduction from the electrode active layers to the metal fill materials residing in the respective anode and cathode via holes, the current collectors protect the metal fill material from corrosive reactions with other battery components while exhibiting good adhesion to the ceramic plate or to an adhesion layer on the plate should there be one. Exemplary current collectors according to the present invention for both the anode and cathode are from about 0.1 microns to about 50 microns thick and comprised of a metallic layer that is deposited on the ceramic plate using a physical vapor deposition (PVD) process, for example sputtering deposition and evaporation deposition, so that the deposited metal covers the respective via hole. Exemplary current collector materials include nickel, titanium, copper, and Ti/NiV composites.

Thus, the present invention describes a miniature electrochemical cell activated with a solid electrolyte. The anode and cathode terminals consist of a metal fill material residing in a respective anode and cathode via hole extending through a ceramic substrate or plate with the metal fill materials being hermetically bonded or sealed to the ceramic plate. The bonds are preferably formed by co-firing a metallic paste filled into the anode and cathode via holes extending through a green ceramic body. The fill metal is preferably platinum, or a platinum/ceramic composite and the ceramic plate is comprised of 3% YSZ or alumina. The ceramic plate is sized and shaped (configured) to close the open end of a metal container to thereby provide the cell casing.

Moreover, the present electrochemical cell is not limited to any one chemistry and can be of an alkaline cell, a primary lithium cell, a rechargeable lithium cell, a Ni/cadmium cell, a Ni/metal hydride cell, a supercapacitor, a thin film solid-state cell, and the like. Preferably, the cell is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_bCo_{1-a-b}O_2$). The present invention is also useful with a solid-state thin film electrochemical cell having a lithium anode, a metal-oxide based cathode and a solid electrolyte, such as an electrolyte of LiPON ($Li_xPO_yN_z$).

These and other aspects of the present invention will become increasingly more apparent to those of ordinary skill in the art by reference to the following descriptions and the appended drawings.

BRIEF DESCRIPTION OF THE DRAWING

FIG. 1 is a cross-sectional view of one embodiment of a miniature electrochemical cell 10 according to the present invention.

DETAILED DESCRIPTION OF THE PREFERRED EMBODIMENTS

A miniature cell according to the present invention is not limited to any one electrochemical system or chemistry. The miniature electrochemical cell can be an alkaline cell, a primary lithium cell, a rechargeable lithium cell, a Ni/cadmium cell, a Ni/metal hydride cell, a supercapacitor, a thin film solid-state cell, and the like. An exemplary miniature electrochemical cell is of a lithium-ion chemistry having a carbon-based anode and a metal oxide-based cathode, such as a cathode of $LiCoO_2$ or $LiNi_aMn_bCo_{1-a-b}O_2$ activated with a solid electrolyte, or the cell is of a solid-state chemistry having a lithium anode, a metal-oxide based cathode and a solid electrolyte. An exemplary solid electrolyte is LiPON electrolyte ($Li_xPO_yN_z$, with x ranging from 3 to 4, y ranging from 3 to 4 and z ranging from 0.1 to 1)).

Referring now to the drawing, FIG. 1 illustrates an embodiment of a miniature electrochemical cell 10 according to the present invention. The cell 10 has a casing comprising an open-ended container 12 of an electrically conductive material, for example, titanium. The open end of the container 12 is closed with a header assembly 14 comprising a ceramic plate 16 hermetically bonded to an outer annular ring 18 by a gold-braze 20. The outer annular ring 18 is of an electrically conductive metal, preferably of the same material as that of the container 12, for example titanium. The ceramic plate 16 supports electrically conductive anode and cathode pathways 22 and 24, which will be described in detail hereinafter, and the outer annular ring 18 is secured to the open-ended container 12 by an annular weld 26 to thereby provide the cell casing.

The open-ended container 12 comprises a bottom wall 28 supporting an upwardly extending annular sidewall 30. The sidewall 30 extends to an upper edge 30A surrounding an open end opposite the bottom wall 28. The design of the bottom wall 28 is not limited to any particular shape; it can have a curved annular shape or a rectangular shape comprising front and back edges meeting right and left edges. However, as those skilled in the art will readily recognize, a myriad of different shapes are contemplated for the bottom wall 28 of the open-ended container 12, the specific shape being limited only by the form factor for the application or device that the cell 10 is intended to power. In that respect, a cross-section of the sidewall 30 has the same shape as that of the bottom wall 28.

The header assembly 14 is manufactured separately from the open-ended container 12 and comprises the electrically conductive outer annular ring 18 hermetically bonded to the ceramic plate 16 by the gold-braze 20. The ceramic plate 16 is comprised of 3% YSZ or essentially high purity alumina ceramic of the chemical formula $Al_2O_3$. "Essentially pure" means that the post-sintered ceramic is at least 96% alumina up to 99.999% alumina. In various embodiments, the post-sintered ceramic plate 16 is at least 90% alumina, preferably at least 92% alumina, more preferably at least 94% alumina, and still more preferably at least 96% alumina.

The ceramic plate 16 is provided with a first via hole 32 and a second via hole 34 that extend to a plate inner surface 16A and a plate outer surface 16B. Platinum-containing fill materials, for example substantially closed pore, fritless and substantially pure platinum materials 22 and 24, fill the respective first and second via holes 32, 34 to thereby form the previously described electrically conductive pathways extending between and to the inner and outer surfaces 16A, 16B of the ceramic plate 16. The platinum-fill materials 22, 24 are hermetically sealed to the ceramic plate 16 and each has a leak rate that is not greater than $1 \times 10^{-7}$ std. cc He/sec.

According to another embodiment of the present invention, in lieu of the substantially pure platinum materials, the via holes 32, 34 are filled with a composite reinforced metal ceramic (CRMC). The CRMC material is a platinum-containing fill material that comprises, by weight %, from about 10:90 ceramic:platinum to about 90:10 ceramic:platinum or, from 70:30 ceramic:platinum to 30:70 ceramic:platinum.

Examples of suitable CRMC materials include, but are not limited to:

a) Alumina ($Al_2O_3$) or zirconia ($ZrO_2$) including various stabilized or partially stabilized zirconia like zirconia toughened alumina (ZTA) and alumina toughened zirconia (ATZ) with platinum (Pt) or palladium (Pd); and b) Alumina ($Al_2O_3$) or zirconia ($ZrO_2$) with iridium, rhenium, rhodium, various Pt alloys (e.g., Pt—Ir, Pt—Pd, Pt—Rh, Pt—Re, Pt—Au, Pt—Ag etc.), Pd alloys (e.g., Pd—Ir, Pd—Re, Pd—Rh, Pd—Ag, Pd—Au, Pd—Pt, Pd—Nb, etc.), Au alloys (e.g., Au—Nb, Au—Ti, etc.), Au alloys (e.g., Au—Nb, Au—Ti, etc.), and Ti alloys (e.g., Ti—Al—V, Ti—Pt, Ti—Nb, etc.).

Other non-limiting biocompatible metals and alloys that may be used in place of platinum include niobium, platinum/palladium, stainless steels, and titanium.

Furthermore any of the following materials may be used alone or in combination with any of the materials already discussed or within this list: silver (Ag), iridium (Ir), rhenium (Re), rhodium (Rh), titanium (Ti), tantalum (Ta), tungsten (W), zirconium (Zr), and vanadium (V); cobalt chromium molybdenum alloy, cobalt chromium nickel iron molybdenum manganese alloy, cobalt chromium tungsten nickel iron manganese alloy, cobalt nickel chromium iron molybdenum titanium alloy, cobalt nickel chromium iron molybdenum tungsten titanium alloy, cobalt nickel chromium molybdenum alloy, copper aluminum nickel alloy, copper zinc alloy, copper zinc aluminum nickel alloy, copper zinc silver alloy, iron chromium alloy, iron chromium nickel alloy, iron chromium nickel aluminum alloy, iron chromium nickel copper alloy, iron chromium nickel copper molybdenum niobium alloy, iron chromium nickel copper niobium alloy, iron chromium nickel copper titanium niobium alloy, iron chromium nickel manganese molybdenum alloy, iron chromium nickel molybdenum alloy, iron chromium nickel molybdenum aluminum alloy, iron chromium nickel titanium molybdenum alloy, iron manganese chromium molybdenum nitrogen alloy, nickel platinum alloy, nitinol, nickel titanium alloy, nickel titanium aluminum alloy, niobium-titanium alloy, platinum iridium alloy, titanium aluminum vanadium alloy, titanium based aluminum iron alloy, titanium based aluminum molybdenum zirconium alloy, titanium based molybdenum niobium alloy, titanium based molybdenum zirconium iron alloy, titanium based niobium zirconium alloy, titanium based niobium zirconium tantalum alloy, titanium molybdenum alloy, titanium niobium alloy, titanium platinum alloy, and titanium-based molybdenum zirconium tin alloy.

The interfacial boundaries between the ceramic plate 16 and the platinum-containing fill materials 22, 24 form respective meandering or undulating paths of sufficient tortuousity such that the boundaries inhibit crack initiation, and more importantly, crack propagation, and additionally, because of the intimacy of the interface, impair leakage of fluids. As used herein, the word tortuous or tortuousity refers to the roughened, complex, or undulating interface that is formed at the boundary between the ceramic plate 16 and the platinum-containing fill materials 22, 24. This tortuous interface is characterized by hills and valleys which are topographically three dimensional and form very strong and reliable hermetic bonds.

In an exemplary embodiment of the present invention, a method of manufacturing the header assembly 14 includes forming a ceramic plate 16 comprising at least 96% alumina; forming the first and second via holes 32, 34 extending through the ceramic plate 16; filling the via holes 32, 34 with an electrically conductive paste (not shown), the electrically conductive paste comprising a platinum powder or a CRMC powder and an inactive organic binder, solvent, and/or plasticizer; placing the ceramic plate 16 and conductive pastes into an air filled heating chamber and heating the assembly to form a monolithic structure. It is believed that the platinum-containing fill materials 22, 24 resulting from the sintered conductive pastes and the ceramic plate 16 form respective interfaces comprising a glass that is at least about 60% silica.

It is understood that throughout this disclosure when CRMC paste and pure platinum paste are referred to, those pastes include solvents and binders that will be baked out during sintering. Suitable binders are selected from the group consisting of ethyl cellulose, acrylic resin, polyvinyl alcohol, polyvinyl butyral and a poly(alkylene carbonate) having the general formula R—O—C(=O)—O with R=C1 to C5. Poly(ethylene carbonate) or polypropylene carbonate) are preferred poly(alkylene carbonates). Suitable solvents are selected from the group consisting of terpineol, butyl carbitol, cyclohexanone, n-octyl alcohol, ethylene glycol, glycerol, water, and mixtures thereof.

In another exemplary embodiment, forming the ceramic plate 16 comprises laminating a plurality of ceramic sheets together.

In greater detail, to achieve sustainable hermeticity between the platinum-containing fill materials 22, 24 and the ceramic plate 16, the following is required. Because the CTE of platinum is sufficiently higher than the CTE of alumina, it is not theoretically possible for alumina to provide compressive forces on a solid platinum body, for example a solid platinum wire, residing in a via hole extending through alumina. To overcome the CTE differences between these two materials, a platinum body residing in an alumina via hole must be formed using a platinum paste having a minimum of 80% platinum solids loading. The term "paste" is defined as a smooth, soft mass having a pliable consistency and comprising pure platinum particles, a binder material and a solvent. In a preferred embodiment, the solids loading of platinum particles in the paste is about 90%. In a more preferred embodiment, the solids loading of platinum particles in the paste is about 95%.

In addition, the via holes 32, 34 must be packed so that the platinum-containing paste occupies at least about 90% of their available space. In a preferred embodiment, the platinum-containing paste occupies about 95% of the via hole space. In a more preferred embodiment, the platinum paste occupies about 99% of the via holes 32, 34.

The shrinkage of the alumina must be no greater than about 20% of that of the volume of the platinum-containing paste in the via holes 32, 34. In a preferred embodiment, shrinkage of the alumina is about 14% of that of the volume of the platinum paste in the via holes 32, 34. In a more preferred embodiment, shrinkage of the alumina is about 16% of that of the volume of the platinum-containing paste in the via holes 32, 34.

After the platinum-containing paste is filled into the via holes 32, 34 extending through the ceramic plate 16, the ceramic plate is exposed to a controlled co-firing heating profile in ambient air that comprises a binder bake-out portion, a sinter portion and a cool down portion.

In one embodiment, the binder bake-out portion of the controlled co-firing heating profile is performed at a temperature of from about 400° C. to about 700° C. for a minimum of about 4 hours. A preferred binder bake-out protocol is performed at a temperature of from about 550° C. to about 650° C. A more preferred binder bake-out is performed at a temperature of from about 500° C. to about 600° C.

Next, the sintering profile portion of the controlled co-firing heating profile is preferably performed at a temperature ranging from about 1,400° C. to about 1,900° C. for up to about 6 hours. A preferred sintering profile is at a temperature from about 1,500° C. to about 1,800° C. A more preferred sintering temperature is from about 1,600° C. to about 1,700° C.

Then, the cool down portion of the controlled co-firing heating profile occurs either by turning off the heating chamber and allowing the chamber to equalize to room temperature or, preferably by setting the cool down portion at a rate of up to about 5° C./min from the hold temperature cooled down to about 1,000° C. At about 1,000° C., the chamber naturally equalizes to room temperature. A more preferred cool down is at a rate of about 1° C./min from the hold temperature to about 1,000° C. and then allowing the heating chamber to naturally equalize to room temperature. In so doing, a robust hermetic seal is achieved between the mating materials of the ceramic substrate or plate 16 and platinum-containing fill materials 22, 24 in the via holes 32, 34.

During processing, compression is imparted by the ceramic plate 16 around the platinum-containing paste in the via holes 32, 34 due to volume shrinkage of the alumina being greater than that of the paste. Furthermore, the platinum is sufficiently malleable at this phase to favorably deform by the compressive forces applied by the ceramic plate 16. The combination of the platinum solids loading in the paste, the platinum packing in the via holes 32, 34 and the shrinkage of the ceramic plate being greater than that of the platinum-containing paste as the paste is solidified to a solid platinum-containing fill material results in the platinum taking the shape of the mating alumina surface. The amount of platinum solids loading, its packing percentage in the via holes 32, 34 and the malleability of the platinum material all contribute to formation of a hermetic seal between the platinum-containing fill materials 22, 24 and the ceramic plate 16. In addition, the compressive forces that result from the greater volumetric shrinkage of the ceramic substrate or plate 30 than that of the platinum-containing fill material 22, 24 in the via holes 32, 34 limits expansion of the platinum and force the platinum to deform to the contour of the surface of the via holes 32, 34 to consequently form a hermetic seal. Thus, an interface between the ceramic plate 16 and the platinum-containing fill materials 22, 24 that conforms to the respective interface surfaces and results in a nearly exact mirror image of the interfacing surfaces is formed, thereby creating a hermetic bond therebetween.

While the above discussion regarding the controlled co-firing heating profile has been presented with respect to an alumina ceramic, it is believed that 3% YSZ ceramic will function in a similar manner.

Analysis of the interface between the ceramic plate 16 and the platinum-containing fill materials 22, 24 of this invention showed not only the creation of an intimate interface, but, in the case of the interfacial layer, a hermetic structure that exhibits an amorphous layer at the interface comprising the elements platinum, aluminum, carbon and oxygen that appear to impart resistance to erosion by body fluids. Both these bonding mechanisms, direct bonding and an amorphous interfacial layer, offer additional tolerance to the CTE mismatch between the ceramic plate 16 and the platinum-containing fill materials 22, 24.

While not shown in the drawing, an outer metallization comprising an adhesion metallization is contacted to the outer circumferential surface 16C of the ceramic plate 16. A wetting metallization is disposed on the adhesion metallization. The gold-braze 20 then hermetically seals the ceramic plate 16 to the outer annular ring 18. The hermetic gold-braze 20 between the outer annular ring 18 and the wetting metallization contacting the adhesion metallization contacting the ceramic plate 16 has a leak rate that is not greater than $1 \times 10^{-7}$ std. cc He/sec.

After the ceramic plate 16 hermetically secured to the outer annular ring 18 with the platinum-containing fill materials 22, 24 residing in the respective via holes 32, 34 is made, a thin-film anode current collector 36 and a spaced-apart thin-film cathode current collector 38 are contacted to the inner surface 16A of the ceramic plate using physical vapor deposition (PVD). The current collectors 36, 38 are spaced inwardly from the gold-braze 20 and are preferably deposited one after the other. The anode and cathode current collectors 36, 38 are preferably continuous layers of copper and titanium, respectively, devoid of perforations, and each has a thickness measured outwardly from the inner surface 16A of the ceramic plate that ranges from about 0.1 µm to about 3 µm. Stainless steel, tantalum, platinum, gold, aluminum, cobalt, molybdenum, a Ti/NiV composite, and alloys thereof are also suitable materials for the anode and cathode current collectors 36, 38. Prior to deposition, however, the ceramic plate 16 is lapped and polished with a slurry or ceramic coated grinding paper followed by diamond polishing to a smooth surface finish having a surface roughness of less than 10 nm.

A layer of cathode active material 40 is supported on the cathode current collector 38. The cathode active material 40 preferably extends to and is coincident with the outer peripheral edge of the current collector 38. The cathode active material 40 has a thickness that ranges from about 1 µm to about 25 µm. Suitable cathode active materials are selected from $LiCoO_2$, $LiMnO_2$, $LiMn_2O_4$, $LiFePO_4$, $Ag_2V_4O_{11}$, $V_2O_5$.

A layer of solid electrolyte 42 ($Li_xPO_yN_z$) contacts the cathode active material layer 40, opposite the cathode current collector 38. The solid electrolyte layer 42 preferably extends to and curves over or around the outer peripheral edge of the cathode active material 40 but is spaced inwardly from the outer edge of the annular ring 18. The solid electrolyte layer 42 has a thickness that ranges from about 1 µm to about 5 µm with its peripheral edge contacting the inner surface 16A of the ceramic plate 16. FIG. 1 also shows the solid electrolyte layer 42 contacting the gold-braze 20.

A layer of anode active material 44 contacts the solid electrolyte 42 opposite the cathode active material 40. The anode active material 44 laps over the solid electrolyte 42 to contact the anode current collector 36. In that manner, the solid electrolyte 42 physically segregates the anode active material 44 from the cathode active material 40 contacting the cathode current collector 38. The anode active material 44 has a thickness that ranges from about 1 µm to about 25 µm, which is somewhat less than the height of the sidewall 30 of the container 16. This provide a space 46 between the anode active material 44 and the bottom wall 28 of the container 16. Since secondary electrochemical cells activated with a solid electrolyte typically undergo expansion and contraction during charging and discharging, this space 46 is necessary to accommodate cycling induced dimensional change. Suitable anode active materials include lithium and its alloys and intermetallic compounds including, for example, Li—Si, Li—Sn, Li—Al, Li—B and Li—Si—B alloys, and mixtures and oxides thereof.

Then, the ceramic plate 16 connected to annular ring 18 by gold-braze 20 is positioned inside the inner surface 30A of the upwardly extending annular sidewall 30 of the open-end container 16. The annular ring 28 is hermetically secured to the sidewall 16 with the weld 26, preferably a laser weld. In this position, an upper surface 18A of the annular ring 18 is substantially co-planar with the upper edge 30A of the annular sidewall 30.

With the annular ring 18 supporting the ceramic plate 16 welded to the open end of the metallic container 12, the anode active material 44 is in electrical continuity with the anode current collector 36 which in turn is in electrical continuity with the platinum-fill material 22 hermetically sealed to the ceramic plate 16 in the first or anode via hole 32. Further, the cathode active material 40 is in electrical continuity with the cathode current collector 38 which in turn is in electrical continuity with the platinum-fill material 24 hermetically sealed to the ceramic plate 16 in the second or cathode via hole 34. Outer surfaces of the anode and cathode platinum-containing fill materials 22, 24 are configured for electrical connection to a load.

An exemplary chemistry for the miniature electrochemical cell 10 shown in FIG. 1 has lithium as an anode active material 44, $LiCoO_2$ as a cathode active material 40 and the separator 42 is of LiPON ($Li_xPO_yN_z$, with x ranging from 3 to 4, y ranging from 3 to 4 and z ranging from 0.1 to 1). LiPON is a solid material that serves as both the separator and the electrolyte for the $Li/LiCoO_2$ couple.

In the exemplary secondary electrochemical cell 10, in addition to lithium, the anode active materials 44 can comprise a material capable of intercalating and de-intercalating an alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless the form of the carbon, fibers of the carbonaceous material are particularly advantageous because they have excellent mechanical properties that permit them to be fabricated into rigid electrodes capable of withstanding degradation during repeated charge/discharge cycling.

The cathode active material 40 of the exemplary secondary electrochemical cell 10 preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$, $LiFePO_4$, $LiNi_xMn_yCo_{1-x-y}O_2$, and $LiNi_xCo_yAl_{1-x-y}O_2$.

For the electrochemical cell 10, the lithiated active material is preferably mixed with a conductive additive selected from acetylene black, carbon black, graphite, and powdered metals of nickel, aluminum, titanium and stainless steel. The cathode further comprises a fluoro-resin binder, preferably in a powder form, such as PTFE, PVDF, ETFE, polyamides and polyimides, and mixtures thereof.

Nickel is a preferred material for the anode current collector 36 while titanium is preferred for the cathode current collector 38.

In addition to titanium, suitable materials for the cell container 12 and the annular ring 18 include stainless steel, mild steel, nickel-plated mild steel, but not limited thereto, so long as the metallic material is compatible for use with the other cell components.

Thus, the open-ended container 12 for the electrochemical cell 10 of the present invention preferably has a diameter that is less 1 cm and a height that is less than 2 mm. More preferably, total volume for the cell casing is less than 0.5 cc. Constructing the casing from a metal open-ended container closed by a header comprising a ceramic plate enables the miniature electrochemical cell of the present invention.

Now, it is therefore apparent that the present invention relates to a miniature electrochemical cell having a total volume of less than 0.5 cc. Moreover, while embodiments of the present invention have been described in detail, such is for illustration, not limitation.

What is claimed is:

1. An electrochemical cell, comprising:
   a) a casing, comprising:
      i) an open-ended container of an electrically conductive material;
      ii) a header comprising a ceramic plate hermetically secured to an outer annular metallic ring, the ceramic plate having a ceramic plate inner surface opposite a ceramic plate outer surface;
      iii) a first electrically conductive pathway comprising a first platinum-containing fill material residing in a first via hole extending through the ceramic plate, and a second electrically conductive pathway comprising a second platinum-containing fill material residing in a second via hole extending through the ceramic plate, wherein the first and second conductive pathways have respective first and second conductive pathway inner surfaces located at or adjacent to the ceramic plate inner surface and first and second conductive pathway outer surfaces located at or adjacent to the ceramic plate outer surface; and
      iv) a weld hermetically securing the outer annular ring of the header to the open end of the container; and
   b) an electrode assembly, comprising:
      i) a cathode current collector contacted to the ceramic plate inner surface at the first conductive pathway inner surface;
      ii) a cathode active material conductively contacted to the cathode current collector opposite the first conductive pathway in the first via hole, the cathode active material having an outer peripheral edge;
      iii) a solid electrolyte that curves over and around the cathode active material including its outer peripheral edge so that the solid electrolyte contacts the inner surface of the ceramic plate;
      iv) an anode current collector contacted to the ceramic plate inner surface at the second conductive pathway inner surface, the anode current collector spaced from the cathode current collector; and
      v) an anode active material contacting the solid electrolyte opposite the cathode active material, the anode active material conductively contacted to the anode current collector opposite the second conductive pathway in the second via hole extending through the ceramic plate of the header,
   c) wherein the outer surfaces of the first and second conductive pathways are configured for electrical connection to a load.

2. The electrochemical cell of claim 1, wherein the ceramic plate is selected from alumina and 3% YSZ.

3. The electrochemical cell of claim 1, wherein the anode and cathode current collectors each have a thickness that ranges from about 0.1 microns to about 50 microns.

4. The electrochemical cell of claim 1, wherein the first and second electrically conductive pathways each comprise substantially pure platinum disposed in a sealed relationship in the respective first and second via holes in the ceramic plate.

5. The electrochemical cell of claim 1, wherein the first and second electrically conductive pathways each comprise a platinum-containing fill material disposed in a sealed relationship in the respective first and second via holes in the ceramic plate, the platinum-containing fill material comprised of, by weight %, from 10:90 ceramic:platinum to 90:10 ceramic:platinum.

6. The electrochemical cell of claim 5, wherein the ceramic in the platinum-containing fill material is either 3% YSZ or alumina, and mixtures thereof.

7. The electrochemical cell of claim 1, wherein the anode and cathode current collectors are characterized as having been contacted to the inner surface of the ceramic plate using a physical vapor deposition process.

8. The electrochemical cell of claim 1, wherein the anode and cathode current collectors are individually selected from the group of nickel, titanium, copper, and a Ti/NiV composite.

9. The electrochemical cell of claim 1, wherein the electrode assembly is of either a $Li/LiCoO_2$ or $Li/LiNi_aMn_bCo_{1-a-b}O_2$ couple.

10. The electrochemical cell of claim 1, wherein the solid electrolyte is $Li_xPO_yN_z$ with x ranging from 3 to 4, y ranging from 3 to 4, and z ranging from 0.1 to 1.

11. An electrochemical cell, comprising:
a) a casing, comprising:
   i) an open-ended container of an electrically conductive material;
   ii) a header comprising a ceramic plate hermetically secured to an outer annular metallic ring by a gold-braze, the ceramic plate having a ceramic plate inner surface opposite a ceramic plate outer surface;
   iii) a first electrically conductive pathway and a second electrically conductive pathway, both conductive pathways comprising a platinum-containing fill material residing in a respective first and second via holes extending through the ceramic plate, wherein the first and second conductive pathways each having a conductive pathway inner surface located at or adjacent to the ceramic plate inner surface and a conductive pathway outer surface located at or adjacent to the ceramic plate outer surface; and
   iv) a weld hermetically securing the outer annular ring of the header to the open end of the container; and
b) an electrode assembly, comprising:
   i) a cathode current collector contacted to the ceramic plate inner surface at the first conductive pathway inner surface;
   ii) a cathode active material conductively contacted to the cathode current collector opposite the first conductive pathway in the first via hole, the cathode active material having an outer peripheral edge, wherein the cathode active material is either $LiCoO_2$ or $LiNi_aMn_bCo_{1-a-b}O_2$;
   iii) a solid electrolyte that curves over and around the cathode active material including its outer peripheral edge so that the solid electrolyte contacts the inner surface of the ceramic plate, wherein the solid electrolyte is $Li_xPO_yN_z$ with x ranging from 3 to 4, y ranging from 3 to 4, and z ranging from 0.1 to 1;
   iv) an anode current collector contacted to the ceramic plate inner surface at the second conductive pathway, the anode current collector spaced from the cathode current collector; and
   v) an anode a cathode active material contacting the solid electrolyte opposite the cathode active material, the anode active material conductively contacted to the anode current collector opposite the second conductive pathway in the second via hole extending through the ceramic plate of the header,
c) wherein the outer surfaces of the first and second conductive pathways are configured for electrical connection to a load.

12. The electrochemical cell of claim 11, wherein the ceramic plate is selected from alumina and 3% YSZ.

13. The electrochemical cell of claim 11, wherein the first and second electrically conductive pathways each comprise substantially pure platinum disposed in a sealed relationship in the respective first and second via holes in the ceramic plate.

14. The electrochemical cell of claim 11, wherein the first and second electrically conductive pathways each comprise a platinum-containing fill material disposed in a sealed relationship in the respective first and second via holes in the ceramic plate, the platinum-containing fill material comprised of, by weight %, from 10:90 ceramic:platinum to 90:10 ceramic:platinum.

15. The electrochemical cell of claim 14, wherein the ceramic in the platinum-containing fill material is either 3% YSZ or alumina, and mixtures thereof.

16. The electrochemical cell of claim 11, wherein the anode and cathode current collectors each have a thickness that ranges from about 0.1 microns to about 50 microns, and wherein the anode and cathode current collectors are selected from the group of nickel, titanium, copper, and a Ti/NiV composite.

17. A method for providing an electrochemical cell, comprising the steps of:
a) providing an open-ended container of an electrically conductive material;
b) providing a ceramic plate having a ceramic plate inner surface opposite a ceramic plate outer surface;
c) providing an outer annular metallic ring and gold brazing the ceramic plate in the ring to thereby form a header;
d) providing a first via hole and a second via hole extending through the ceramic plate to the ceramic plate inner and outer surfaces;
e) filling a paste of a platinum-containing material into the first and second via holes and then heating the ceramic plate to transform the paste into first and second platinum-containing fill materials hermetically sealed to the ceramic plate in the respective first and second via holes, wherein the first and second platinum-containing fill materials each comprise a platinum-containing fill material inner surface located at or adjacent to the ceramic plate inner surface and a platinum-containing fill material outer surface located at or adjacent to the ceramic plate outer surface;
f) contacting a first current collector to the inner surface of the ceramic plate at the first platinum-containing fill material in the first via hole;
g) contacting a second current collector to the inner surface of the ceramic plate at the second platinum-containing fill material in the second via hole, the first and second current collectors being spaced from each other;
h) depositing a first active material onto the first current collector opposite the first platinum-containing fill material in the first via hole, the first active material having an outer peripheral edge;
i) depositing a solid electrolyte layer onto the first active material, the solid electrolyte curving over and around the first active material including its outer peripheral edge so that the solid electrolyte contacts the inner surface of the ceramic plate;
depositing a second, opposite polarity active material onto the solid electrolyte opposite the second first active material, the second active material conductively contacted to the second current collector opposite the second conductive pathway in the second via hole extending through the ceramic plate of the header; and
k) welding the annular ring of the header to the open end of the container to thereby provide a casing housing the first and second active materials prevented from direct physical contact with each other by the solid electrolyte layer,
l) wherein the outer surfaces of the first and second platinum-containing fill materials are configured for electrical connection to a load.

18. The method of claim 17, including selecting the first and second current collectors from the group of nickel, titanium, copper, and a Ti/NiV composite, and contacting the first and second current collectors to the inner surface of the ceramic plate using a physical vapor deposition process, the first and second current collectors individually having a thickness that ranges from about 0.1 microns to about 50 microns.

19. The method of claim 17, including, with the paste of platinum-containing material filled into the first and second via holes in the ceramic plate, subjecting the ceramic plate to a heating profile that comprises a binder bake-out portion, a sinter portion and a cool down portion to transform the paste into the first and second platinum-containing fill materials hermetically sealed to the ceramic plate in the respective first and second via holes.

20. The method of claim 17, including providing the first active material being an anode active material and the second active material being a cathode active material.

\* \* \* \* \*

UNITED STATES PATENT AND TRADEMARK OFFICE
CERTIFICATE OF CORRECTION

PATENT NO. : 11,114,714 B2
APPLICATION NO. : 16/431025
DATED : September 7, 2021
INVENTOR(S) : Robert S. Rubino, Keith W. Seitz and Brian P. Hohl It is certified that error appears in the above-identified patent and that said Letters Patent is hereby corrected as shown below:

In the Claims

Column 11, Line 42 (Claim 11, Line 42) delete "a cathode".

Signed and Sealed this
Ninth Day of May, 2023

Katherine Kelly Vidal
*Director of the United States Patent and Trademark Office*